Nov. 20, 1962 J. A. HILL 3,064,748
COMBINED TRACTOR HOOD, GRILLE, AND INSTRUMENT PANEL
Filed March 3, 1961
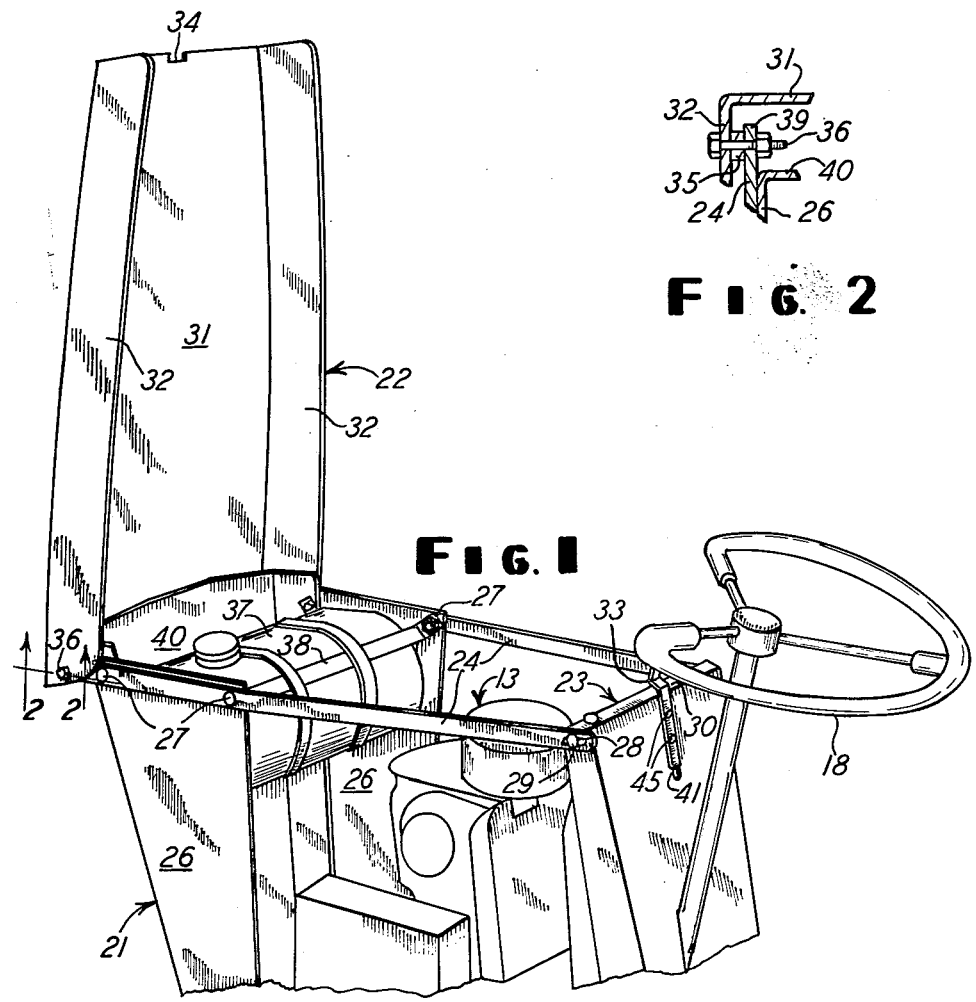
INVENTOR:
JOSEPH A. HILL
BY: Arthur J. Hansmann
ATTORNEY

United States Patent Office 3,064,748
Patented Nov. 20, 1962

3,064,748
COMBINED TRACTOR HOOD, GRILLE, AND
INSTRUMENT PANEL
Joseph A. Hill, Glen Ellyn, Ill., assignor to Jacobsen
Manufacturing Company, Racine, Wis., a corporation
of Wisconsin
Filed Mar. 3, 1961, Ser. No. 93,229
3 Claims. (Cl. 180—69)

This invention relates to a tractor, and more particularly, it relates to a combined hood, grille, and instrument panel for a tractor or the like.

It is an object of this invention to provide a combined hood, grille, and instrument panel for a tractor or the like and wherein the power plant of the tractor, namely the engine and its attending parts, are suitably enclosed to protect them from the elements and to render them harmless toward persons using the tractor, yet having the aforementioned parts simple and inexpensive in their manufacture and disposed to make the power plant readily accessible for both the necessary operating air supply and for servicing and repairing.

Still another object of this invention is to provide a combined tractor, hood, grille, and operating or instrument panel wherein the several parts are inexpensive but are readily assembled together for a sturdy combination required in tractor service, and wherein the parts are adjustable for the necessary fitting together in assembly.

A specific object of this invention is to provide a hood for a tractor or the like, wherein the hood is sturdily attached to the remainder of the tractor in its assembled position therewith but is readily pivotal to another or open position for the purpose of inspection and servicing of the engine disposed below the hood.

Other objects and advantages will become apparent upon reading the following disclosure in light of the accompanying drawings wherein:

FIG. 1 is a perspective view of a fragment of a tractor taken from a rear perspective vantage point and showing the hood thereof in the open position.

FIG. 2 is an enlarged sectional view taken on the line 2—2 of FIG. 1.

The same reference numerals refer to the same parts between the two views.

The drawings show a fragment of a tractor having an engine generally indicated at 13. A steering wheel 18 is further included in the general assembly of the tractor.

The important feature in this construction is the combination of the front grille 21, the hood 22, and the instrument panel 23. The upper ends of the grille 21 and the panel 23 terminate in approximately the same horizontal plane and they are attached together by connecting members or braces 24. The members 24 are attached to the opposite sides 26 of the grille 21 by means of bolts 27, and the rear ends of the members 24 connect to the upper end of the panel 23 by means of the bolts such as the bolt 29. It will also be noted that the rear ends of the members 24 are provided with slots 28 extending in the horizontal plane mentioned and of course the bolts 29 pass through the slots 28 so that the members 24 are adjustably connected to the panel 23 and therefore between the grille 21 and the panel 23.

In this manner, the upper ends of the grille 21 and the panel 23 are secured together so that they are retained in their shown and desired position and so of course that they are secure in that position, but without the requirement of elaborate and expensive and heavy parts securing them and attaching them together.

It will also be noted that the hood 22 is generally of a U-shape as it has an intermediate portion 31 and two side portions 32 depending below the intermediate portion 31. At this time it will further be noted that the panel 23 has a spring clip 33 extending thereabove and the rear end of the hood 22 has a notch 34 therein such that when the hood 22 is placed in the lowered position, the spring clip 33 engages the notch 34 to extend thereover and beyond and of course thus secure the hood 22 in the downward position as desired.

Another important feature of this over-all arrangement is the manner of pivotally mounting the hood 22 to the tractor. A spacer 35 is disposed between the hood side 32 and the member 24. Hood 22 is supported on the upper surface 30 of the panel 23, and the clip 33 is adjustably secured to the panel by bolts 45 received in a slot 41 in the panel. Therefore, the clip 33 can be adjusted to bear down on the hood 22 as needed to secure the latter and prevent vibration and the like. The front ends 39 of the connectors 24 extend slightly beyond the front wall 40 of the grille 21 and they receive two pivot bolts 36, such as the bolt 36 in FIGS. 1 and 2. It will further be noted that the opposite sides or legs 32 of the hood 22 are received by the respective bolts 36 so that the hood 22 is pivotal on the front ends of the members 24 by virtue of the pivot bolts 36. With this arrangement, the hood 22 can be pivoted between the lowered position (not shown) and the raised position in FIG. 1. In this manner, the hood can be readily opened or raised so that the engine can be serviced and also so that the gasoline tank 37 is readily accessible when the hood is raised, but it will be further noted that the tank 37 is completely enclosed by the grille sides 26 and the hood 22 when the latter is lowered. A mounting strap 38 extends between two of the connecting bolts 27 to provide a support for the tank 37 as shown and to thereby place the latter in a secure but yet remote position on the tractor.

Of course it will also be understood that the hood 22 can be placed into its opened or raised position and be retained therein by moving the hood over-center to put it out of the way while access is had to the engine or the gasoline tank or other parts shown. Such opened position is achieved without the requirement of any expensive and complicated springs for retaining the hood in the opened position, yet it is fully opened and of course secure in its over-center opened position.

While a specific embodiment of this invention has been shown and described, it should be obvious that certain changes could be made therein and the invention should therefore be limited only by the scope of the appended claims.

What is claimed is:

1. A combined tractor hood, grille, and panel comprising a grille uprightly disposed on said tractor in a forward position and terminating in an upper end, a panel uprightly disposed on said tractor and spaced rearwardly of said grille and terminating in an upper end substantially level with said upper end of said grille, braces connected to and extending between said upper ends for supporting the same and said braces including forwardly disposed ends extending beyond said grille, and a hood pivotally attached to said braces on an axis extending transverse to and at said ends of said braces and extending the length of said braces for overlying said grille and said braces and said panel and being of an inverted U-shape in cross-section in said transverse direction and depending laterally of said braces for enclosing the lateral sides of the same.

2. A combined tractor hood, grille, and panel comprising a grille uprightly disposed on said tractor in a forward position and terminating in an upper end, a panel uprightly disposed on said tractor and spaced rearwardly of said grille and terminating in an upper end substantially level with said upper end of said grille, braces connected to and extending between said upper ends for supporting the same and said braces extending forwardly of said grille, and a hood pivotally mounted on the forwardly extending ends of said braces on an axis extending transverse to the fore-and-aft axis of said tractor and extending the length of said braces and laterally therebeyond for overlying said grille and said braces and said panel and being in abutting support on said panel and in releasably secured position thereon, said hood being pivotally attached to said braces through at least a right angular pivotal attachment for over-center pivoting from said secure position to a hood-open position.

3. In a tractor of the type having a chassis and an engine mounted thereon in a forward position, the combination comprising a grille included in said tractor and uprightly disposed forward of said engine and including side panels extending along the sides of said tractor to present a space between said side panels and including upper ends, a strap connected at opposite ends to said upper ends of said side panels and spanning said space, a gasoline tank mounted on said strap in said space and occupying the space only between said upper ends, an instrument panel included in said tractor and being uprightly disposed rearwardly of said engine, two braces extending between said side panels of said grille and said instrument panel for structurally supporting the latter two, bolts extending through and attaching said side panels and said braces and said strap all in one unit, a hood pivotally mounted on said braces adjacent one of said grille and said panel through at least a right-angular pivotal attachment and extending horizontally therebetween to the other thereof and overlying said engine, said hood being U-shaped in cross-section and including sides disposed laterally of the respective ones of said braces and extending therebelow for enclosing said braces, and a latch on the other of said grille and said panel for releasably securing said hood thereto for over-center pivotal movement of said hood.

References Cited in the file of this patent

UNITED STATES PATENTS

| | | |
|---|---|---|
| 1,365,837 | Leverett | Jan. 18, 1921 |
| 1,794,323 | Riley | Feb. 24, 1931 |
| 2,184,086 | Saunders | Dec. 19, 1939 |
| 2,235,496 | Greig | Mar. 18, 1941 |
| 2,871,967 | Du Shane | Feb. 3, 1959 |